United States Patent [19]

Potter et al.

[11] Patent Number: 5,087,435
[45] Date of Patent: Feb. 11, 1992

[54] POLYCRYSTALLINE DIAMOND AND METHOD FOR FORMING SAME

[75] Inventors: David K. Potter; Thomas J. Ahrens, both of Pasadena, Calif.

[73] Assignee: California Institute of Technology, Pasadena, Calif.

[21] Appl. No.: 54,285

[22] Filed: May 26, 1987

[51] Int. Cl.⁵ .................................... C01B 31/06
[52] U.S. Cl. .......................... 423/446; 156/DIG. 68
[58] Field of Search ............... 123/446; 156/DIG. 68

[56] References Cited

U.S. PATENT DOCUMENTS

| | | | |
|---|---|---|---|
| 3,238,019 | 3/1966 | De Carli | 423/446 |
| 3,399,254 | 8/1968 | Dunnington | 423/446 |
| 3,401,019 | 9/1968 | Cowan et al. | 423/446 |
| 3,667,911 | 6/1972 | Balchan et al. | 423/446 |
| 3,714,332 | 1/1973 | Rasquin et al. | 423/446 |
| 3,816,085 | 6/1974 | Hall | 423/446 |
| 3,851,027 | 11/1974 | Balchan et al. | 423/446 |
| 4,035,472 | 7/1977 | Tominaga | 423/446 |
| 4,104,441 | 8/1978 | Fedoseev et al. | 423/446 |

OTHER PUBLICATIONS

Sawai et al., Report of the Research Lab. of Engineering Materials, Tokyo Inst. of Technology, No. 11, pp. 119-127, 1986, Yokohama, Japan.
Stein et al., Metal Progress, pp. 83-87 (Apr., 1964).
Raikes et al., Geophysics J. R. Astr. Soc., 58:717-748 (1979).
Raikes et al., High Pressure Science and Tech., 6th AIRAPT Conference, vol. 2, pp. 889-895, Timmerhaus et al., Eds.
Gourdin et al., Shock Waves in Condensed Matter, 1983, pp. 99-102, Asay et al. Eds. (1984).
Raybould, Shock Waves and High-Strain-Rate Phenomena in Metals, pp. 895-911, Meyers et al., Eds. (1981).
Gourdin, Progress in Materials Science, 30:39-80 (1986).
Korth et al., Metallurgical Applications of Shock-Wave and High-Strain-Rate Phenomena, pp. 129-147, Murr et al., Eds.
Berry et al., Metallurgical Applications of Shock-Wave and High-Strain-Rate Phenomena, pp. 167-187, Murr et al., Eds.

Ahrens et al., Rapid Solidification Processing Principles and Technologies, III, pp. 672-677, Mehrabian, Ed.
Steinbeck et al., J. Appl. Phys., 58:4374-4382 (1985).
Hall, Proc. Physical Society B, 64:747-753 (1951).
Miller, Proc. Roy. Soc., A, 269:368-384 (1962).
Bowden et al., Proc. Roy. Soc., A, 248:350-367 (1958).
Gourdin, Mat. Res. Soc., Proc. Symp. Defect Properties and Processing of High-Technology, Non-Metallic Materials, 307-138, Boston, Mass.
Bundy et al., J. Chem. Phys., 46 (9): 3437-3446 (1967).
Weathers et al., Melting of Carbon at 50 to 300 KBAR (manuscript).
Kondo et al., J. Materials Sci., 20:1033-1048 (1985).
Bundy, J. Chem. Phys., 38 (3):618-630.
Shaner et al., J. Physique, 45 (11): C8-235-C8-237 (1984).
Ahrens, J. Geophysical Res., 84 (B3): 985-998 (1979).
Bundy, J. Geophysical Res., 85 (B12): 6930-6936 (1980).
Pavlovksii, *Soviet Physics-Solid State,* 13 (3): 741-742 (1971).
Van Vechten, P. Rev. B, 7 (4):1479-1505 (1973).
Schwarz, Acta Metall., 32 (8):1243-1252 (1984).
Venkatesan, Physical Rev. Ltrs., 53 (4):360-363 (1984).
Braunstein et al., Beam Solid Interactions and Phase Transformations, Kurz et al., Eds. 51:233 et seq. (1986).
Gold et al., Science, 225:921-922 (1984).
Bowden et al., Nature, 203 (4940):27-30 (1964).
Schmitt et al., Geophysical Res. Ltrs., 10 (11):1077-1080 (1983).
Bowden et al., Nature, 201 (4926):1279-1281 (1964).
Schmitt et al., Shock Waves in Condensed Matter, pp. 261-265 (1986), Gupta, Ed.
Kasiraj, Acta Metall., 32 (8):1235-1241 (1984).
Ahrens, Shock Wave Techniques for Geophysics and Planetary Physics (manuscript).
Gourdin, Dynamic Consolidation of Metal Powders (Feb. 1982) (manuscript).
C & EN, p. 17 (Jan. 26, 1987).

*Primary Examiner*—Robert Kunemund
*Attorney, Agent, or Firm*—David W. Collins

[57] ABSTRACT

A fused compact of polycrystalline diamond is formed by dynamically shocking either fine diamond crystals or a mixture of fine diamond crystals and graphite.

11 Claims, 1 Drawing Sheet

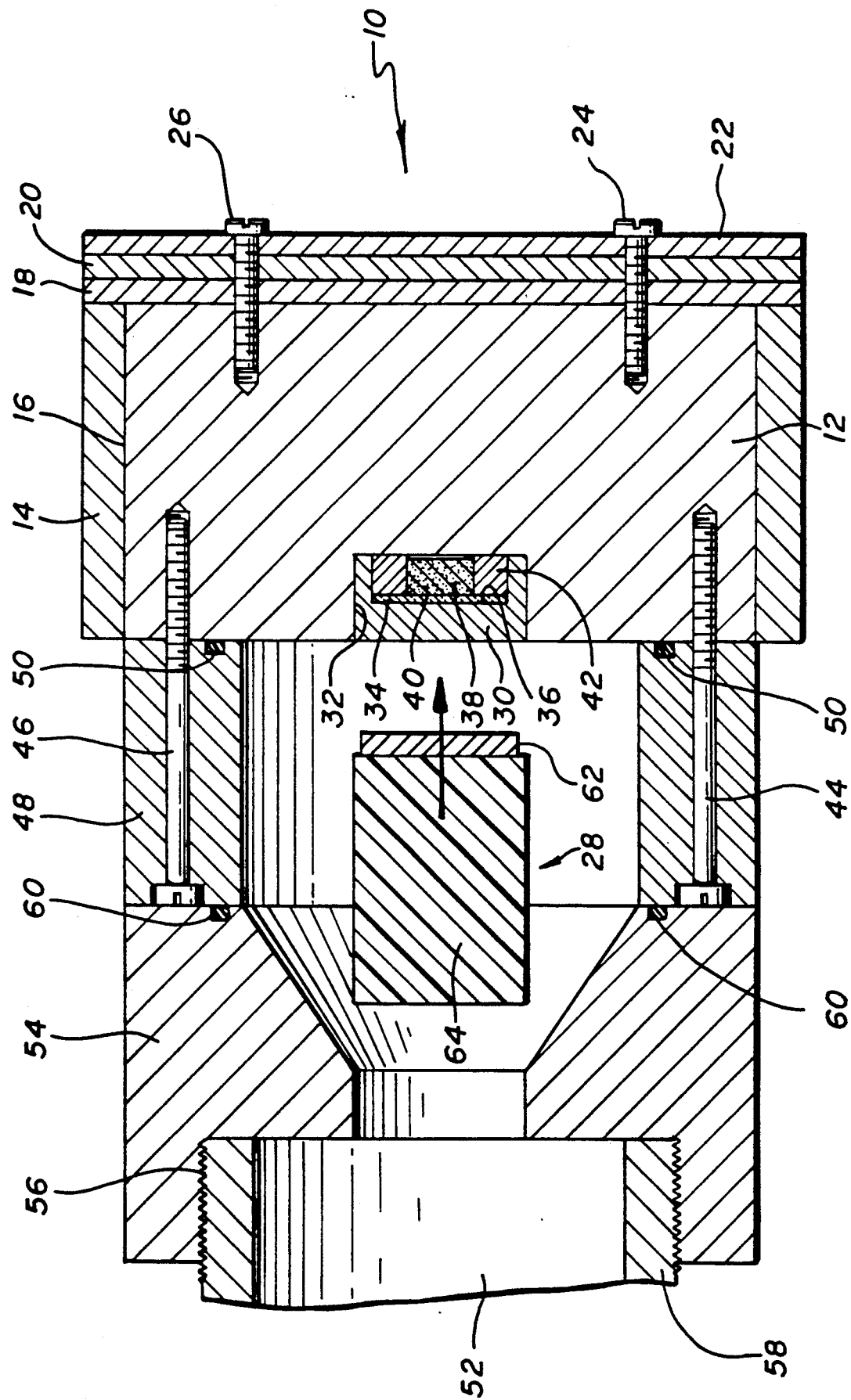

POLYCRYSTALLINE DIAMOND AND METHOD FOR FORMING SAME

BACKGROUND

The present invention is directed to a method for forming a fused polycrystalline diamond and the fused polycrystalline diamond formed by such method.

This work was supported by the National Science Foundation, Grant Number DMR-8315214, and is subject to any right that the United States government may have herein.

Diamond powder id relatively inexpensive. Such particles can range from submicron to hundreds of microns in particle size. Although having some industrial uses, e.g. as dust in abrasive wheels, diamond powder cannot be used in many industrial applications due to its small particle size.

Accordingly, there is a need for an efficient and cost effective technique for consolidating diamond powder into a larger diamond mass such that the resulting consolidated diamond mass can be employed in industrial applications where diamond powder is unsuitable for use.

SUMMARY

The present invention satisfies this need by providing a method for forming a polycrystalline diamond. As used herein the term "polycrystalline diamond" means a composition comprising a plurality of diamond crystals wherein at least a part of the surface portion of the diamond crystals has been heated to a sufficiently high temperature under a sufficiently high pressure such that the crystals fused together to form a consolidated mass having a particle size greater than the particle size of any of the individual crystals. By use of the method of the present invention, diamond powder can be fused into polycrystalline diamond.

According to the method of this invention, fine diamond crystals are placed in a target zone and a projectile is directed at the target zone. The projectile has sufficient momentum such that when the projectile impacts the diamond crystals in the target zone at least a part of the surface portions of the diamond crystals are heated to a sufficiently high temperature under sufficiently high pressure that the crystals fuse together, without cracking, to form a fused compact polycrystalline diamond.

Substantially all of the diamond crystals placed in the target zone have a particle size of less than about 250 microns. Since the probability of a diamond crystal having flaws or defects increases as the diamond crystal size increases, it is preferred that substantially all of the diamond crystals have a particle size of less than about 100 microns. In addition, since smaller size diamond crystals are less likely to crack when hit by a rarefaction or reflected shock wave, it is preferred that substantially all of the diamond crystals have a particle size of less than about 50 microns.

On the other hand, it has been found that diamond crystals having very small particles sizes are relatively hard to compact in the target zone. Accordingly, it is preferred that substantially all of the diamond crystals have a particle size greater than about 1 micron. In addition, due to the difficulty of forming polycrystalline diamonds from very fine diamond crystals, it is preferred that substantially all of the diamond crystals have a particle size greater than about 4 microns.

In order to expose a greater surface area of the diamond crystals to grain sliding friction, it is also preferred that the diamond crystals have a substantially uniform size.

The total bulk density of diamond crystals in the target zone is preferably about 30 to about 80 percent of the theoretical crystal density of diamond (3.51 g/cm). As used herein, the bulk density of diamond crystals is equal to the total mass of diamond crystals placed in the target zone divided by the volume of the target zone occupied by the diamond crystals. Below about 30 percent of the theoretical crystal density of diamond, it is difficult to generate sufficient pressure within the target zone to be capable of fusing the diamond crystals together. In fact, when the generated pressure is too low, the diamond crystals can undesirably convert to graphite. Above about 80 percent of the theoretical crystal density of diamond, it is difficult to heat the surface of the diamond crystals to a temperature sufficiently high to melt a sufficient part of the surface to enable the diamond crystals to form the fused polycrystalline diamond.

To facilitate the heating of the surface portion of the diamond crystals to a sufficiently high temperature to melt at least a part of such surface, it is preferred that the method of the present invention further comprises the step of evacuating gases present in the target zone prior to the projectile impacting the target zone. The reason for this preferred embodiment is that the coefficient of friction between diamond crystal surfaces increases as the amount of gases between adjacent diamond crystal surfaces decreases. As the coefficient of friction increases, the elevation in surface temperature of a diamond crystals due to the sliding of adjacent diamond surfaces against one another increases, thereby (a) aiding in the melting of such surfaces and (b) facilitating the fusion of the diamond crystals into polycrystalline diamond.

Optionally, the diamond crystals can be mixed with graphite. An exemplary mixture of the diamond crystals and graphite comprises about 60 to about 95 weight percent diamond crystals and from about 5 to about 40 weight percent graphite. In addition, the graphite and diamond crystals have an exemplary particle size ratio of about 1:1 to about 1:20. Preferably, the mixture has a pore volume in the target zone of about 30 to about 60 percent of the bulk volume occupied by the mixture in the target zone. As used herein the term "bulk volume" denotes the space occupied by the mixture, including the void space between the individual particles which constitute the mixture. In addition, the term "pore volume" as used herein denotes the void space between the individual particles which constitute the mixture. Below a pore volume of about 30 percent of the bulk volume, it is difficult to generate enough pressure to convert the graphite to diamond. Furthermore, as discussed above, when the generated pressure is too low the diamond crystals can be undesirably converted to graphite. Above a pore volume of about 60 percent of the bulk volume, the mixture becomes too compact, thereby making it difficult to generate a temperature sufficiently high to melt a sufficient part of the diamond crystal surface to enable the diamond crystals to form a polycrystalline diamond.

The mixture of diamond crystals and graphite is especially appropriate for use when substantially all of the diamond crystals have a particle size of below about 5 microns. Under such circumstances, the graphite enables the very fine diamond crystals to be more readily compacted in the target zone and facilitates the heating and melting of a sufficient portion of the surface of such very fine diamond crystals such that polycrystalline diamond is more readily formed. To enhance the effect of graphite, it is preferred that substantially all the diamond crystals be coated with graphite as a result of mixing the diamond crystals and graphite together.

The use of graphite also adds value to the process and product of the present invention in that at least a portion of the graphite is converted to diamond crystals and fuses to form a portion of the fused polycrystalline diamond. In fact, experiments have shown that substantially all the graphite can be converted to diamond crystals.

In order to make the process of the present invention economically attractive, it is preferred that the pressure produced within the target zone be from about 7 to about 20 GPa.

DRAWING

These and other features, aspects, and advantages of the present invention will become better understood with reference to the following description, appended claims, and accompanying drawing which is an elevational sectional view of a momentum trap recovery assembly capable of use in the method of the present invention.

DESCRIPTION

The present invention is directed to (a) a method for forming polycrystalline diamond and (b) the polycrystalline diamond formed thereby. The polycrystalline diamond can be used in industrial applications where fine diamond crystals are not capable of being employed.

The method of the present invention entails dynamically consolidating diamond crystals or a mixture of diamond crystals and graphite into polycrystalline diamond. In one exemplary technique, consolidation of either the diamond crystals or the mixture is achieved by the impact of a high speed projectile. The projectile can be launched with explosives as discussed in Stein et al., *Metal Progress*, pp. 83-87 (April, 1964), Hagemeyer et al., *Intern. J. Powder Metall*, 4(3): 19-25 (1978), Raikes et al., *Geophys. J. Roy. Astron. Soc.*, 58: 717-748 (1979), and Raikes et al., *High Pressure Science and Technology*, Editors Timmerhaus et al., pp. 889-894, Plenum Press, N.Y. (1979), these publications being incorporated herein by this reference. Alternatively, the projectile can be launched with compressed gas systems such as disclosed in Giourdin et al., *Shock Waves in Condensed Matter*—1983, Editors Assay et al., pp. 99-102, North-Holland, N.Y. (1984) and Raybould, *Shock Waves and High-strain-rate Phenomena in Metals: Concepts and Applications*, Editors Meyers et al., pp. 895-911, Plenum Press, N.Y. (1981), these publications being incorporated herein by this reference.

With reference to the drawing, an exemplary momentum trap recovery assembly 10 that can be employed in a projection consolidation method embodying features of the present invention comprises a housing 12, a cylindrical ring 14 adjacent the axial surface 16 of the housing 12, and three spall plates 18, 20, and 22 which are secured to the housing 12 by screws 24 and 26. The cylindrical ring 14 helps prevent damage to the housing 12 caused by radial expansion of the housing 12 due to a projectile 28 impacting a stainless steel target 30 seated in an instep 32 in the housing 12. The spall plates 18, 20, and 22 absorb some of the momentum produced by the shock generated by the impacting projectile 28, thereby helping to prevent damage to the housing 12.

A single crystal disc 34 of $Al_2O_3$ is located on an interior surface 36 of the target 30. The $Al_2O_3$ disc 34 is employed to prevent the metal of the target 30 from interacting with a sample 38 as a result of the projectile 28 impacting the target 30. The sample 38 is located in the interior region or target zone 40 of the target 30 and is radially bounded by a washer 42. Prior to inserting the target 30 into the instep 32, the sample 38 can be statically compacted. As discussed in greater detail below, the sample 38 can be natural diamond crystals, synthetic diamond crystals, or mixtures thereof. In addition, the sample 38 can also include graphite.

The momentum trap recovery assembly 10 is secured by nylon screws 44 and 46 to a vented spacer 48. An O-ring 50 is employed to form an airtight seal between the spacer 48 and the housing 12. The spacer 48 has a plurality of holes (not shown) for venting gases formed by launching the projectile 28. These holes can be sealing covered with a thin sheet of material (not shown) that is capable of substantially preventing any leakage into the vacuum that is customarily drawn in the trajectory zone 52 prior to launching the projectile 28. In addition, the sheet of material must also be capable of venting the gases formed upon launching the projectile 28. An exemplary sheet of material is Mylar TM brand polyester film having a thickness of about 0.002 inch.

The spacer 48 is attached by stainless steel screws (not shown) to a crylindrical flange 54 that is threadingly engaged on the end 56 of a gun barrel 58. A second O-ring 60 is used to form an airtight seal between the flange 54 and the spacer 48.

The projectile 28 is directed at the sample 38 within the target zone 40. The projectile 28 can comprise a flyer plate 62 secured to a base 64. The projectile 28 is capable of being accelerated to a speed of up to about 2 km/s. The momentum of the projectile 28 is such that when the projectile 28 impacts the sample 38 at least a part of the surface portion of the diamond crystals is heated to a sufficiently high temperature under sufficiently high pressure that the diamond crystals fuse together, without cracking, to form a fused polycrystalline diamond having a particle size greater than the particle size of any of the individual crystals. When the sample 38 contains graphite, at least a portion of the graphite is converted to diamond crystals and fuses to form a portion of the fused polycrystalline diamond.

To obtain the fused polycrystalline diamond at least a partial melting along the diamond crystal surface or boundary and resolidification within the duration of the shock state or shock pulse time is required. In other words, to consolidate the sample 38, the shock pulse duration time $t_d$ must exceed the freezing time $t_f$ plus the cooling time $t_c$ of the melt layer. When the sample 38 is diamond crystals, the freezing time $t_f$ can be estimated by the method of Schwarz et al., *Acta Met.*, 32: 1243 et seq. (1984), this publication being incorporated herein by this reference, using the following formula:

$$t_f = \frac{\pi D}{16} \left[ \frac{L d H_m}{D C_p (T_m - T_o)} \right]^2 \quad (1)$$

where D is the mean thermal diffusivity of the diamond crystals (assumed to about $1 \times 10^{-4}$ m²/sec), d is the diameter of the diamond crystal, $C_p$ is the specific heat at constant pressure (assumed to be 2 kJ/kg), $(T_m - T_o)$ is the difference between the melting and the initial temperatures, taken as 4000° C., $H_m$ is the heat of fusion of diamond, estimated by the method disclosed in Vechten, *Phys. Rev. B.*, 7: 1479 et seq (1973), this publication being incorporated herein by this reference, to be about 9.2 MJ/kg. L, which is the upper bound for the mass fraction of melted material in a typical compacted diamond sample, can be estimated using the equation $$L = \frac{P_H (m - 1) V_o}{2(C_p (T_m - T_o) + H_m)} \quad (2)$$

where $P_H$ is the shock pressure which can be estimated using the impedance matching technique discussed in Gourdin, *Prog. in Materials Science*, 30: 39 et seq. (1986), this publication being incorporated herein by this reference, m is the dimension taken as 1.85, and $V_o$ is the initial crystal volume. For example, for diamond crystal diameters of about 10 microns and a $P_H$ of about 10 GPa, the freezing time, $t_f$, is about 1.3 nsec.

The cooling time following solidification, $t_c$, is difficult to estimate but must be long enough for the compact to acquire mechanical strength.

As can be seen from formula 1, as the diamond crystal diameter d increases, the freezing time $t_f$ increases. Accordingly, since the shock pulse time $t_d$ must be greater than the freezing time $t_f$ plus the cooling time $t_c$ of the melt layer, the shock pulse time $t_d$ also increases as the diamond crystal diameter d increases. The shock pulse time $t_d$ can be regulated by manipulating the thickness of the flyer plate 62 because the duration of the shock pulse time $t_d$ is proportional to the flyer plate 62 thickness. In general, the shock pulse time $t_d$ is approximately equal to two times the travel time of the shockwave through the flyer plate 62. Therefore, the duration of the shock pulse time $t_d$ can be increased by increasing the thickness of the flyer plate 62.

The efficiency of the method of the present invention can be increased by evacuating gases present in the target zone 40 prior to the projectile 28 impacting the target 30. This is because the coefficient of friction between sliding diamond crystal surfaces increases as the amount of gases between the sliding surfaces decreases. The increased coefficient of friction aids in the melting of the sliding diamond crystal surfaces, thereby facilitating the fusion of the diamond crystals into the polycrystalline diamond.

In general, the higher the pressure generated within the target zone 40, the easier it is to form polycrystalline diamond. However, to achieve an economical process, it is preferred that the pressure generated within the target zone 40 be from about 7 to about 20 GPa. Below about 7 GPa, it is difficult to melt the surface of the diamond crystals. Above about 20 GPa, the process can begin to become uneconomical.

As noted above, the sample 38 can be either diamond crystals or a mixture of diamond crystals and graphite. Diamond crystals suitable for use in the method of the present invention have a particle size of less than about 250 microns. However, because larger diamond crystals are more likely to have structural flaws or defects, it is preferred that substantially all of the diamond crystals have a particle size of less than about 100 microns. Furthermore, since smaller size diamond crystals are less likely to crack when hit by a rarefraction wave, it is more preferred that substantially all of the diamond crystals have a particle size of about 50 microns or less.

It has been found that very fine diamond crystals are hard to compact. Accordingly, it is preferred that substantially all of the diamond crystals have a particle size of at least about 0.1 microns and, more preferably, at least about 1 micron. It has also been found that diamond crystals having a particle size of less than about 4 microns do not form a fused polycrystalline structure when the pressure within the target zone 40 is less than about 20 Gpa. Accordingly, since the cost of the method of the present invention increases with increasing pressure, it is preferred that substantially all of the diamond crystals employed in the method of the present invention have a particle size of about 4 microns or greater.

It is also preferred that the diamond crystals have a substantially uniform size. This enables a greater surface area of the diamond crystals to be exposed to grain sliding friction and thereby helps facilitate the production of polycrystalline diamond by the method of the present invention.

All particle sizes presented herein for the diamond crystals and graphite are number averages based on the equivalent diameter of the particles.

Preferably the bulk density of the diamond crystals in the target zone 40 is about 30 to about 80 percent of the theoretical crystal density of diamond (3.51 g/cm). At bulk densities below about 30 percent of the theoretical crystal density of diamond, it is difficult to achieve pressures within the target zone 40 sufficient to form fused polycrystalline diamond. In fact, when the pressure generated within the target zone 40 is too low, the diamond crystals can undesirably convert to graphite. At bulk densities above about 80 percent of the theoretical crystal density of diamond, it is hard to form polycrystalline diamond due to the difficulty in forming a sufficient melt on the surface portion of the diamond crystals.

With respect to employing the mixture of diamond crystals and graphite as the sample 38, one advantage of such mixture is that at least a portion of the graphite is converted to diamond crystals during the dynamic consolidation process of the present invention and fuses to form a portion of the fused polycrystalline diamond. Furthermore, it has been observed that substantially all of the graphite is converted to diamond as the result of the process of the present invention. Accordingly, use of graphite in the method of the present invention results in a product having added value in that graphite is a less expensive starting material than diamond crystals.

An exemplary mixture of diamond crystals and graphite capable of use in the present invention comprises about 60 to about 95 weight percent diamond crystals and from about 5 to about 40 weight percent graphite. In addition, an exemplary particle size ratio of graphite to diamond crystals is about 1:1 to about 1:20. Preferably, the mixture is compacted in the target zone 40 so that the mixture has pore volume of about 30 to about 60, and more preferably to about 50, percent of the bulk volume occupied by the mixture in the target zone 40. Below a pore volume of about 30 percent of the bulk volume, it is difficult to generate enough pressure to convert the graphite to diamond. Furthermore, as mentioned above, when the generated pressure is too low the diamond crystals can be undesirably converted to graphite. Above a pore volume of about 60 percent of the bulk volume, the mixture becomes too compact, thereby making it difficult to generate a temperature sufficiently high to melt a sufficient part of the diamond crystal surface to enable the diamond crystals to form polycrystalline diamond.

It has been found that graphite is especially suitable for use with diamond crystals having a particle size of less than about 5 microns. More particularly, it has been observed that graphite helps to pack very fine diamond crystals. In addition, it has been observed that the method of the present invention readily yields fused polycrystalline diamond when diamond crystals having a particle size of less than about 5 microns are present in a mixture with graphite. Although not wanting to be bound by theory, it is believed that for a thin surface skin of a poor conductor, e.g., graphite, surrounding a good conductor, e.g., diamond, the time $t_d$ taken for a quantity of heat E to flow through the skin can be approximated by $$t_d = \frac{E d}{D_s C p (T - T_o) A} \quad (3)$$

where $D_s$ is the thermal diffusivity of the poor conductor, $p$ is the density of the poor conductor in the skin, $C_p$ is the specific heat at constant pressure, d is the thickness of the skin, A is the total surface are of the poor conductor in the skin, and T and $T_o$ are the temperatures outside and inside the skin, respectively. The quantity of heat E flowing through the surface skin of a particle can be given by the formula $$E = E_T M \quad (4)$$

where M is the mass of the particle and $E_T$ is the total work done, per unit mass, in compacting the powder. $E_T$ can be approximated by the formula $$E_T = P_H V_d (m-1)/2 \quad (5)$$

where $P_H$ is the shock pressure, m, the distension, is equal to $V_o/V_\infty$, and $V_o$ and $V_\infty$ are the porous and single crystal specific volume, respectively.

Because the thermal diffusivity of graphite is much less than the thermal diffusivity of diamond, it is believed that the time taken for heat to flow through a thin layer of graphite is much greater than the time taken for heat to flow through an equivalent layer of diamond. Accordingly, a thin layer of graphite surrounding a diamond crystal is believed to effectively delay thermal equilibrium between the surface and the interior of the diamond crystal. This enables the heat to remain for a longer period of time on the surface of the diamond crystals causing increased melting of such surface and thereby aiding in the shock consolidation of the diamond crystals into polycrystalline diamond. It is therefore preferred that the mixture of diamond crystals and graphite be substantially uniform. More preferably, the diamond crystals and graphite are mixed in a manner such that substantially all of the diamond crystals are coated with graphite.

The use of a poor thermal conducting material in conjunction with a good thermal conducting material, to enhance the fusion and consolidation of the good conducting material, is also applicable to materials in addition to graphite and carbon. The good and poor thermal conducting materials can be compositions having different intermolecular configurations of the same elements or molecules, as in the case of diamond and graphite, or can be compositions having different elements or molecules.

A second exemplary method for dynamically consolidating diamond crystals or a mixture of diamond crystals and graphite is explosive consolidation. Exemplary explosive consolidation apparatuses are disclosed by Korth et al. and Williamson et al. in *Proceedings of Explomet 1985:International Conference on Metallurgical Applications of Shock-Wave and High-strain-rate Phenomena*, Portland, Ore., July 28–Aug. 1, 1985, Editors Murr et al., this publication being incorporated herein by this reference. In an explosive consolidation procedure, a shock wave generated as a result of detonating an explosive is directed at a sample in a target zone. For purposes of the present specification and claims, this shock wave is considered as being analogous to and the equivalent of the high speed projectile 28.

EXAMPLES

In these examples, methods for forming a fused polycrystalline diamond are demonstrated.

EXAMPLES 1–7

Dynamic Consolidation of Diamond Crystals

A. Methodology

Shock compaction was performed using a flyer plate type shock wave generator and momentum trap recovery system of Ahrens et al., *Rapid Solidification Process of Principles and Technologies, III*, edited by Mehrabian, National Bureau of Standards, 672 (1983), which publication is incorporated herein by reference. The drawing shows the momentum trap recovery assembly 10 employed in this experiment. A stainless steel flyer plate 62 (about 0.625 inches in diameter and about 0.100 inch thick) mounted on a Lexan brand polycarbonate base 64 (about 1.182 inches in length and about 0.768 inch in diameter) was accelerated by a 20 mm propellant gun. The flyer plate 62 was impacted against a stainless steel capsule or target 30 containing a sample 38 of diamond crystals as set forth in Table I. This produced a shock pulse with a duration of about 0.8 μsec which was inferred from the flyer plate thickness. Prior to impact, the sample 38 occupied a cylindrical bulk volume within the target zone 40 of about 0.200 inch in diameter and about 0.140 inch in length. The initial density of the diamond crystal samples are also set forth in Table I. The $Al_2O_3$ disc 34 was about 0.020 inch thick. Immediately prior to impact, the flyer plate 44 had a velocity as specified in Table I.

Hugoniots, i.e., thermodynamic curves, for the diamond crystal sample were constructed using the shock, $U_s$, and particle, $U_p$, velocity relationship for single crystal diamond as disclosed in Pavloskii, *Sov. Phys. Solid State*, 13, 741 et seq. (1971), which publication is incorporated herein by this reference, as follows:

$$U_s (km/sec) = 12.16 + 1.00 U_p \quad (6)$$

The shock pressure $P_H$ produced within the target zone 40 by the impact was estimated using the impedance matching technique as disclosed in Gourdin, supra. The estimated shock pressure $P_H$ is also indicated in Table I. The Hugoniot volume $V_H$ is given by The estimated continuum temperature is also set forth in Table I.

TABLE I

| EXAMPLE NUMBER | INITIAL SAMPLE | INITIAL DENSITY (% crystal density) | PROJECTILE VELOCITY (km/s) | SHOCK+ PRESSURE (GPa) | SHOCK TEMPERATURE (K) | RECOVERED SAMPLE CONDITION |
| --- | --- | --- | --- | --- | --- | --- |
| 1 | 100–150 μm natural diamond | 68 | 1.90 | 18.2 | 920 | Compacted, no fusion |
| 2 | 100–150 μm natural diamond | 55 | 2.01 ± 0.20 | 14.1 ± 2.0 | 1140 ± 120 | Compacted, no fusion |
| 3 | 4–8 μm synthetic diamond powder | 50 | 1.81 | 10.8 | 104 | Fused compact |
| 4 | <5 μm synthetic diamond powder | 55 | 1.81* | 12.0 | 1020 | Unconsolidated |
| 5 | <5 μm synthetic diamond powder | 38 | 1.81 | 7.5 | 1140 | Unconsolidated |
| 6 | 4–8 μm synthetic diamond powder | 50 | 1.81 | 10.8 | 1040 | Fused compact |
| 7 | 100 μm synthetic diamond | 55 | 1.86 | 12.7 | 1050 | Compacted, no fusion |

+Initial shock state
*Inferred from propellant mass $$V_H = V_\infty - \frac{u_p^2 \text{ (final)}}{P_H} \quad (7)$$

where $V_\infty$ is the initial specific volume of the diamond crystal sample. The temperature along the principal isentropes, $T_s$, was calculated via the equation $$T_s = T_o \exp\left[\int_{V_H}^{V_o} \frac{\gamma}{V} dV\right] \quad (8)$$

where $T_o$ is room temperature, $V_o$ is the specific volume of single crystal diamond, and $\gamma$ is the Gruneisen parameter which is taken to be 0.9 in accordance with Pavloskii, supra. The pressure along the principal isentropes, $P_s$, was calculated using the following equation $$\frac{P_H(V_\infty - V_H)}{2} = -\int_{V_o}^{V_H} P_s dV + \frac{V_H}{\gamma}(P_H - P_s) \quad (9)$$

the shock (continuum) temperature $T_H$ generated was then calculated by the formula $$T_H = T_s + \frac{V_H(P_H - P_s)}{\gamma C_v} \quad (10)$$

where the specific heat at constant volume $C_v$ was estimated using $$C_v (J/kgK) = \frac{3R \times 10^7}{M} \quad (11)$$

where R is the gas constant ($8.2057 \times 10^{-2}$ liter-atm mole$^{-1}$ deg$^{-1}$) and M is the atomic weight of carbon.

B. Analysis

Analyses of the recovered material from Examples 3 and 6 revealed fusion between the diamond crystals. This observation was emphasized by the inability to distinguish original crystal boundaries in many regions of the scanning electron micrographs (SEM). Moreover, the tensile strength of the fused impact was high as judged by the difficulty to remove crystals with a steel probe, and the deposition of steel onto the sample surfaces when scored by the probe. X-ray diffraction data indicated characteristic diamond peaks in the polycrystalline diamond product and no evidence of conversion to graphite.

The continuum temperature calculated for Examples 3 and 6 are well below the temperature (4300° K.) believed to be necessary to melt the diamond crystal surface in order to form polycrystalline diamond. Therefore, although not to be bound by theory, it is believed that grain sliding friction along the surface or boundary of the diamond crystals is the main mechanism for generating the necessary temperatures that enables the formation of the fused polycrystalline diamond of the present invention.

SEM analyses of the material recovered from Examples 1 and 2 revealed that the diamond crystals were compacted and their bulk density was very high (estimated to be about 95 to about 99 percent of the theoretical diamond crystal density) as indicated by the lack of voids between the individual diamond crystals. A high degree of fracturing was observed in the individual crystals. SEM analysis of the material recovered from Example 7 showed similar fracturing. The amount of fracturing made it difficult to distinguish any evidence of fusion. However, it is believed that fusion was not achieved in Examples 1, 2, and 7 because the pressure generated within the target zone was not high enough to melt a sufficient amount of diamond crystal surface necessary to produce a fused polycrystalline diamond. The tensile strength of the compacts was only moderate since it was possible to remove individual diamond crystals with a steel probe.

Material recovered from Examples 4 and 5 was observed via SEM analysis to be very unconsolidated. Much of the material was loose powder, while the more consolidated regions were friable. These latter regions consisted of clumps of individual particles with no evidence of fusion. With respect to Example 4 and 5, it is believed that for diamond crystals having a particle size of less than about 5 microns, the time constant $t_o$ for the thermal equilibrium between the surface and interior (a) is approximately equal to $d_2/D$ and (b) approaches the shock transit time $t_s$ through the diamond crystal. The shock transit time $t_s$ is equal to $d/U_s$. Accordingly, it is postulated that surface melting and fusion did not occur when the diamond crystals were less than about 5 microns because the heat produced at the diamond crystal surface was dissipated too quickly. However, this unsuccessful result can be rectified by employing high shock pressures and/or, as shown below, by mixing small particle size diamond crystals with graphite.

EXAMPLES 8-10

Dynamic Mixture of Diamond Crystals and Graphite

A. Methodology

The methodology of Example 1 was employed with the following modifications:

1. The sample was a mixture of synthetic diamond crystals and graphite having a composition as set forth in Table II. The mixture was manually prepared by mixing the diamond crystals and graphite until the mixture had a uniform color tone. The initial pore volume of the mixture in the target zone 40 prior to impact as well as the projectile velocity upon impact are also indicated in Table II.

TABLE II

| EXAMPLE NUMBER | INITIAL SAMPLE | INITIAL PORE VOLUME (%) | PROJECTILE VELOCITY (km/s) | RECOVERED SAMPLE CONDITION |
|---|---|---|---|---|
| 8 | Natural 100–150 μm diamond crystals plus 13 weight % graphite | 35 | 1.81 | Compacted, no fusion |
| 9 | Synthetic 4–8 μm diamond crystals plus 16 weight % graphite | 49 | 1.84 | Fused compact Homogenous texture |
| 10 | Synthetic <5 μm diamond crystals plus 16 weight % graphite | 49 | 1.87 | Compacted partial fusion |

B. Analysis

The material recovered from Example 9 was well consolidated and exhibited evidence of fusion between diamond crystals. X-ray diffraction data showed characteristic diamond peaks and a very minor characteristic peak for graphite in the polycrystalline diamond product. This indicated that most of the graphite had converted to diamond crystal as a result of the experiment of Example 9.

SEM analysis of material recovered from Example 10 revealed a very homogenous texture much more so than for the material recovered from the experiments of Examples 3 and 6. However the strength of the polycrystalline diamond of Example 10 appeared to be slightly weaker than was obtained from the polycrystalline diamond obtained in Example 3 and 6. X-ray diffraction data showed characteristic diamond peaks and a very small characteristic peak for graphite in the polycrystalline diamond product. This again indicated that most of the graphite had been converted to diamond crystals as a result of the experiment of Example 10.

SEM analysis of the material recovered from Example 8 indicated that the sample compacted and that its bulk density was very high (estimated to be about 98% of the single crystal density). Individual crystals exhibited a high degree of fracturing. The fractures made it difficult to distinguish any fusion between the diamond crystals, if indeed any fusion was present. The strength of the compact was only moderate since the particles in the compacted sample could be removed with a steel probe. It is believed that a polycrystalline diamond was not produced in Example 8 because the shock pressure was not sufficiently high to generate the requisite degree of melting on the surfaces of the diamond crystals.

Accordingly, as demonstrated in Examples 3, 6, 8, and 9, the method of the present invention is capable of producing polycrystalline diamond in an economical manner. The polycrystalline diamond can be employed in industrial applications where diamond crystals have usually been incapable of use.

Although the present invention has been described in considerable detail with reference to certain preferred versions thereof, other versions are possible. Therefore, the spirit and scope of the appended claims should not necessarily be limited to the description of the preferred versions contained herein.

What is claimed is:

1. A method for forming a fused compact of polycrystalline diamond comprising the steps of:

(a) placing a plurality of fine diamond crystals in a target zone, substantially all of the diamond crystals having a particle size of about 4 to about 8 microns: and (b) impacting the target zone with a projectile, the projectile having sufficient momentum that at least part of the surface portion of the diamond crystals in the target zone is heated to a sufficiently high temperature under a pressure ranging from about 7 to about 20 GPa that the crystals fuse together, without cracking, to form a fused compact of polycrystalline diamond having a particle size greater than the particle size of any of the individual crystals.

2. The method of claim 1 wherein the diamond crystals have a substantially uniform size.

3. The method of claim 1 wherein the bulk density of the diamond crystals in the target zone is about 30 to about 80 percent of the theoretical crystal density of diamond.

4. The method of claim 1 further comprising the step of evacuating gases present in the target zone prior to the projectile impacting the target zone.

5. A method for forming a fused compact of polycrystalline diamond comprising the steps of:
  (a) mixing a plurality of fine diamond crystals and graphite, substantially all of the diamond crystals having a particle size of about 4 to about 8 microns;
  (b) placing at least a portion of the mixture in a target zone; and
  (c) impacting the target zone with a projectile, the projectile having sufficient momentum that (i) at least a part of the surface portion of the diamond crystals is heated to a sufficiently high temperature under a pressure ranging from about 7 to about 20 GPa that the crystals fuse together, without cracking, to form a fused compact of polycrystalline diamond having a particle size greater than the particle size of any of the individual crystals and ii) at least a portion of the graphite is converted to diamond crystals and fuses to form a portion of the fused polycrystalline diamond.

6. The method of claim 5 wherein the mixture comprises about 60 to about 95 weight percent diamond crystals and from about 5 to about 40 weight percent graphite.

7. The method of claim 5 wherein the graphite and diamond crystals have a particle size ratio of about 1:1 to about 1:20.

8. The method of claim 5 wherein the step of placing results in the mixture having a pore volume in the target zone of about 30 to about 60 percent of the bulk volume that the mixture occupies in the target zone.

9. The method of claim 5 wherein the step of mixing results in a mixture having a substantially uniform distribution of diamond crystals and graphite.

10. The method of claim 5 wherein the step of mixing results in coating substantially all of the diamond crystals with graphite.

11. The method of claim 5 wherein substantially all of the graphite is converted to diamond crystals.

* * * * *